US012562044B2

(12) United States Patent
Liu

(10) Patent No.: US 12,562,044 B2
(45) Date of Patent: Feb. 24, 2026

(54) MOTION MONITORING SYSTEM

(71) Applicant: Wen-Hsiung Liu, Kaohsiung (TW)

(72) Inventor: Wen-Hsiung Liu, Kaohsiung (TW)

(73) Assignee: Wen-Hsiung Liu, Kaohsiung (TW)

( * ) Notice: Subject to any disclaimer, the term of this patent is extended or adjusted under 35 U.S.C. 154(b) by 76 days.

(21) Appl. No.: 18/047,657

(22) Filed: Oct. 19, 2022

(65) Prior Publication Data

US 2023/0326319 A1 Oct. 12, 2023

(30) Foreign Application Priority Data

Apr. 12, 2022 (TW) ................................ 111203675

(51) Int. Cl.
*G08B 21/04* (2006.01)

(52) U.S. Cl.
CPC ................................ *G08B 21/0446* (2013.01)

(58) Field of Classification Search
None
See application file for complete search history.

(56) References Cited

U.S. PATENT DOCUMENTS 5,905,436 A * 5/1999 Dwight .............. G08B 21/0415 600/595
8,237,571 B2 * 8/2012 Wang ................. G08B 13/1672 704/270
8,718,672 B2 * 5/2014 Xie ....................... H04W 4/029 455/418
9,406,210 B2 * 8/2016 Kim ................... G08B 21/0423
9,928,716 B2 * 3/2018 Karkowski ........ G08B 21/0423
10,070,805 B1 * 9/2018 Friedman ............... G08B 21/02
10,420,487 B1 * 9/2019 Choi ......................... G06N 3/09
10,553,096 B2 * 2/2020 Ashar .................... G08B 21/02
10,736,555 B2 * 8/2020 Carr-Jordan ............ G06F 3/014
11,477,302 B2 * 10/2022 Roberts ............... G06F 16/9535
2008/0001735 A1 * 1/2008 Tran ....................... A61B 8/565 340/539.22
2008/0272918 A1 * 11/2008 Ingersoll .............. A61B 5/0002 600/595
2009/0051524 A1 * 2/2009 Lim ..................... A61B 5/6887 340/573.1
2015/0068069 A1 * 3/2015 Tran ..................... A43B 13/183 340/693.1
2015/0356849 A1 * 12/2015 Ishii ................... G08B 21/0423 340/573.1
2016/0260310 A1 * 9/2016 Chuang ................ G08B 25/001
2019/0190862 A1 * 6/2019 Choudhary .............. A61B 5/22
2019/0197863 A1 * 6/2019 Kao .................. G08B 21/0272

(Continued)

*Primary Examiner* — Muhammad Adnan
(74) *Attorney, Agent, or Firm* — Hannah Tien

(57) ABSTRACT

The invention is related to a motion monitoring system for monitoring a motion status of a to-be-taken care person living alone, comprising: at least one sensor for sensing the motion status of the to-be-taken care person, being a suspender sensor, and/or a door sensor, and/or a toilet motor sensor, and each provided with a corresponding dynamic acceleration IC, so as to produce a motion signal during changing from being still to moving and to transmit a still message in every 3 seconds; at least one corresponding receiver for receiving the still message; and a cloud computer, including a processor to calculate the accumulated still time of each of the at least one sensor so as to notify a guardian for the to-be-taken care person for 24 hour monitoring timely.

5 Claims, 1 Drawing Sheet

(56) References Cited

U.S. PATENT DOCUMENTS

| | | | | |
|---|---|---|---|---|
| 2019/0254523 | A1* | 8/2019 | Avitan | G06Q 50/188 |
| 2019/0272727 | A1* | 9/2019 | Yang | G08B 21/0492 |
| 2019/0343402 | A1* | 11/2019 | Gehring | A61B 5/0002 |
| 2019/0374133 | A1* | 12/2019 | Shen | G08B 21/0446 |
| 2021/0125482 | A1* | 4/2021 | Rolfe | G08B 21/043 |
| 2021/0244364 | A1* | 8/2021 | Ten Kate | A61B 5/7267 |
| 2021/0319894 | A1* | 10/2021 | Sobol | G06N 7/01 |
| 2022/0292946 | A1* | 9/2022 | Yamamoto | G01S 5/02 |
| 2022/0392625 | A1* | 12/2022 | Allen | G06Q 10/0875 |
| 2023/0307122 | A1* | 9/2023 | Liu | G16H 10/60 |
| 2024/0428671 | A1* | 12/2024 | Yamamoto | G08B 21/0277 |
| 2025/0019941 | A1* | 1/2025 | Wang | E03B 7/072 |
| 2025/0148893 | A1* | 5/2025 | Duale | G08B 29/186 |

* cited by examiner

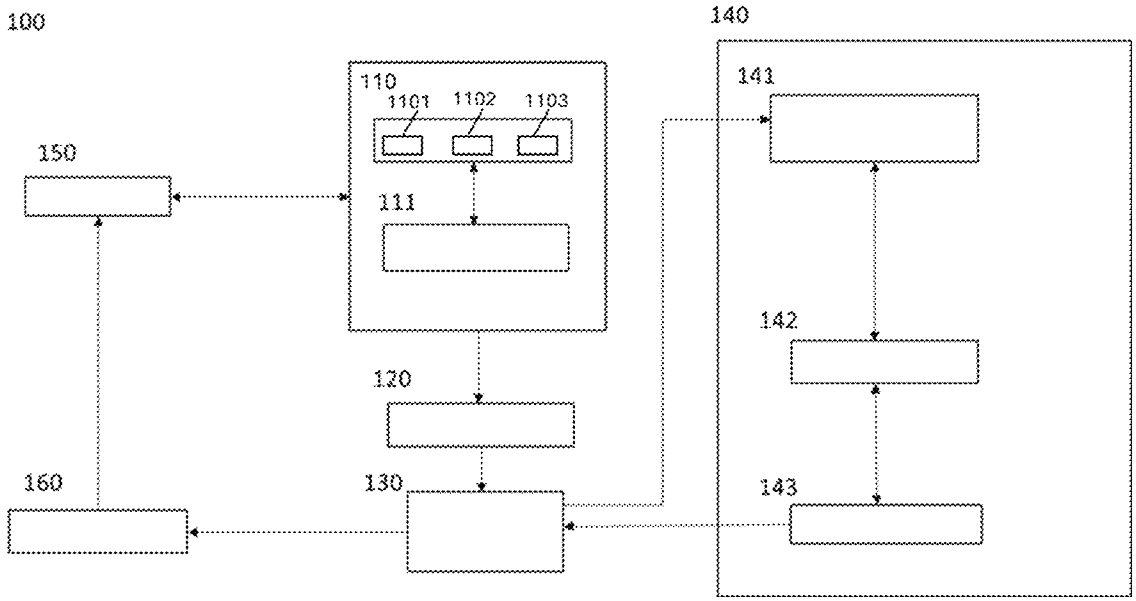
100
110
1101
1102
1103
111
150
120
130
160
140
141
142
143

MOTION MONITORING SYSTEM

CROSS-REFERENCE TO RELATED APPLICATIONS

This application claims priority to Taiwan Application No. 111203675 filed on Apr. 12, 2022, the entire content of which is incorporated herein by reference.

FIELD OF THE INVENTION

The invention is related to a motion monitoring system for monitoring at cloud a moving status of a to-be-taken care person living alone, including a cloud computer for monitoring if the to-be-taken care person is in a unsafe status, and thereby for informing a guardian, via sensing of the moving status through a sensor(s) and calculating the still time accumulation through a calculation module in a processor.

BACKGROUND OF THE INVENTION

Efficient caring of the to-be-taken care old people living alone is a problem not easily solved. Monitoring equipment's are provided in the market aiming on if the life is subject to danger, while the living alone old people is outdoor or indoor. However, the targeted thereon is too strong, and/or the monitoring equipments are expensive and complicated. While disposing or wearing the equipment, it is not only troublesome, but also impractical or poorly efficient due to that not everyone is affordable.

Therefore, if it is feasible to propose a motion monitoring system to monitor the living alone old people in a simple, efficient and timely manner, so as to find out whether the living alone old people is in a abnormal condition, and thereby to send out a timely notification and to accomplish the task in a cheaper way, it will be a great aid in taking care and monitoring.

SUMMARY OF THE INVENTION

An objective of the invention is to propose a motion monitoring system utilizing a cloud computer so as to monitor the motion status of a living alone old people to be taken-care and thereby to find out if the old people is abnormal in motion and subject to unsafe, and send out notification in a timely manner of 24 hours.

A further objective of the invention is to propose a cloud motion monitoring system with a simple and efficient detection way, capable of judging if the living alone old people is in an abnormal status of motion, and thereby solving the public health problem of efficiently taking care of the living alone aged people.

A motion monitoring system for cloud monitoring a motion status of a to-be-taken care person living alone according to the invention, comprises: at least one sensor for sensing the motion status of the to-be-taken care person according to an installing position, wherein the at least one sensor is a suspender sensor, and/or a door sensor, and/or a toilet motor sensor, each provided with a corresponding dynamic acceleration IC so as to produce a motion signal during changing from being still to moving, while a motion acceleration speed is reaching a predetermined value, thereby to avoid fake moving, in which each of the at least one sensor transmits a still message in every 3 seconds when the to-be-taken care person is not moving; at least one corresponding receiver for receiving the still message transmitted by the corresponding at least one sensor; and a cloud computer, including an input module for receiving the still message transmitted by the at least one corresponding receiver via a network, a processor connected to the input module and provided with a timing function, for accumulating still time of the still message, and an output module connected with the processor, wherein as the moving sensed by the at least one sensor is exceeding induction of each of the corresponding dynamic acceleration IC, the motion signal is produced and transmitted to the input module of the cloud computer via the at least one receiver and the network, and the processor of the cloud computer is to process resetting of the still time so as to re-calculate the still time, and wherein the processor calculates the accumulated still time of each of the at least one sensor so as to calculate how long the to-be-taken care person does not move indoor, and/or does not open the door, and/or does not go to toilet, and as respectively of or a total of the accumulated still time exceeds a preset time, a notification signal is transmitted from the output module of the cloud computer via the network so as to notify a guardian for the to-be-taken care person, whereby, the notion status of the to-be-taken care person living alone is monitored and 24 hour monitoring timely is provided.

BRIEF DESCRIPTION OF THE DRAWINGS

FIG. 1 is a schematic structural diagram of a motion monitoring system of the invention.

DETAILED DESCRIPTION OF THE INVENTION

As shown in the structural diagram of FIG. 1, a motion monitoring system 100 for monitoring a motion status of a to-be-taken care person 150 living alone according to the invention comprises:

at least one sensor 110 for sensing the motion status of the to-be-taken care person according to an installing position, wherein the at least one sensor is a suspender sensor 1101, and/or a door sensor 1102, and/or a toilet motor sensor 1103, each provided with a corresponding dynamic acceleration IC 111 so as to produce a motion signal during changing from being still to moving, while a motion acceleration speed is reaching a predetermined value, thereby to avoid fake moving, in which each of the at least one sensor 110 transmits a still message in every 3 seconds when the to-be-taken care person is not moving;

at least one corresponding receiver 120 for receiving the still message transmitted by the corresponding at least one sensor 110; and a cloud computer 140, including an input module 141 for receiving the still message transmitted by the at least one corresponding receiver 120 via a network 130, a processor 142 connected to the input module 141 and provided with a timing function, for accumulating still time of the still message, and an output module 143 connected with the processor, wherein as the moving sensed by the at least one sensor 110 is exceeding induction of each of the corresponding dynamic acceleration IC 111, the motion signal is produced and transmitted to the input module 141 of the cloud computer 140 via the at least one receiver 120 and the network 130, and the processor 142 of the cloud computer 140 is to process resetting of the still time so as to re-calculate the still time, and wherein the processor 142 calculates the accumulated still time of each of the at least one sensor so as to calculate how long the to-be-taken care person 150 does not move indoor, and/or does not open the door, and/or does not go to toilet, and as respectively of or a total of the accumulated still time exceeds a preset time, a notification signal is transmitted from the output module 143 of the cloud computer 140 via the network 130 so as to notify a guardian 160 for the to-be-taken care person 150, whereby, the notion status of the to-be-taken care person 150 living alone is monitored and 24 hour monitoring timely is provided.

In the motion monitoring system 100 of the invention, the guardian 160 is a managing person or a relative of the to-be-taken care person 150.

According to the motion monitoring system 100 of the invention, a preset time of the processor 142 of the cloud computer 140 is set depending on the installing position of the at least one sensor 110, and/or on a health condition of the to-be-taken care person 150, so as to determine if there is danger due to no moving of the to-be-taken care person 150, and as mentioned above, the installation position is at the suspender of the to-be-taken care person, or at the door where the to-be-taken care person comes in or gets out, or an appropriate position in the toilet.

Further, in the motion monitoring system 100 of the invention, the network 130 is wired or wireless.

In addition, the at least one receiver 120 is a radio receiving sensor for receiving the still message transmitted by the at least one sensor 110 in 15 meters. Further, the notification signal via the network 130 is a LINE message or voice. Moreover, for fear of safety, if the guardian 160 does not receive from the network the moving information of the to-be-taken care person 150 in a preset time, a more correct judgement is that the there sensors, i.e. the suspender sensor, the door sensor and the toilet motor sensor are concurrently used, which do not sense any moving and thus no moving signals are transferred, resulting in accumulation of a longer still time, so as to determine more precisely that the to-be-taken person is in a unsafe condition. As such, a notification signal is transmitted timely, in which communication with the to-be-taken person using a mobile phone may be proceeded, or an on-spot check may be taken.

What is claimed is:

1. A motion monitoring system for monitoring a motion status of a to-be-taken care of person living alone, comprising:

at least one sensor for sensing the motion status of the to-be-taken care of person, wherein the at least one sensor is a suspender sensor, door sensor, and/or a toilet motor sensor, each being provided with a corresponding dynamic acceleration IC (Integrated Circuit) for producing a motion signal for sensing that the to-be-taken care of person moves from standstill and related motion acceleration is reaching a predetermined value, wherein each of the at least one sensor further transmits a standstill message every 3 seconds if the to-be-taken care of person is not moving;

at least one corresponding receiver for receiving the standstill message transmitted by the corresponding at least one sensor; and a cloud computer, including an input module for receiving the standstill message transmitted by the at least one corresponding receiver via a network, a processor connected to the input module for counting and accumulating a total time of the standstill message, and for interrupting the counting when receiving the motion signal produced by the corresponding dynamic acceleration IC and transmitted to the input module of the cloud computer via the at least one receiver and the network, wherein the processor resets the total standstill time to re-calculate the standstill time, and wherein the processor calculates the counted and accumulated standstill time of each of the at least one sensor se as to calculate how long the to-be-taken care of person does not move indoor, and/or does not open a door, and/or does not go to toilet, when the total of the counted and accumulated standstill time exceeds a preset time, a notification signal is transmitted from an output module, being connected to the cloud computer via the network, to notify a guardian for the to-be-taken care of person, wherein the preset time of the processor of the cloud computer is determined based on an installation position of the at least one sensor, and based on a health condition of the to-be-taken of care person, and wherein the motion status of the to-be-take care of person living alone is continuously monitored for 24 hours and timely provided to the guardian.

2. A motion monitoring system of claim 1, wherein the guardian is a managing person or a relative of the to-be-taken care of person.

3. A motion monitoring system of claim 1, wherein the network is wired or wireless.

4. A motion monitoring system of claim 1, wherein the at least one receiver is a radio receiving sensor for receiving the standstill message transmitted by the at least one sensor disposed in within 15 meters.

5. A motion monitoring system of claim 1, wherein the notification signal via the network is a LINE message or voice message.

* * * * *